May 21, 1968 H. L. FIELDING 3,384,196
VEHICLE ARTICULATED ON A CANT
Filed March 14, 1966

HARRY L. FIELDING
INVENTOR
BY
BUCKHORN, BLORE, KLARQUIST & SPARKMAN
ATTORNEYS

United States Patent Office 3,384,196
Patented May 21, 1968

3,384,196
VEHICLE ARTICULATED ON A CANT
Harry L. Fielding, Portland, Oreg., assignor to Mixermobile Manufacturers, Inc., Portland, Oreg., a corporation of Oregon
Filed Mar. 14, 1966, Ser. No. 534,186
4 Claims. (Cl. 180—79.2)

ABSTRACT OF THE DISCLOSURE

A front frame carried at its front end by an axle is oscillated on a horizontal axis relative to a yoke which is pivotally connected to a rear frame on an axis of articulation sloping upwardly and rearwardly. The rear end of the rear frame is carried by a rear axle. Since the axis of articulation is canted rearwardly and upwardly, turning of the front frame relative to the rear frame tends to raise the yoke against the weight of the frames. Thus, turning is resisted somewhat and the rear frame tends to trail the front frame very well. Aligned horizontal cylinder devices on the yoke engage lugs on the front frame to resist oscillation of the front and rear frames about the horizontal axis.

DESCRIPTION

This invention relates to a vehicle articulated on a cant, and more particularly to a close-coupled joint structure for a front end loader articulated on a cant.

In an articulated vehicle such as, for example, a front end loader and the like, in which there is provided a front frame and a rear frame, each carried by a set of wheels and in which the frames are pivotal relative to one another about a generally vertical pivot axis for steering the vehicle and in which one of the frames is pivotal about a horizontal pivot axis relative to the other frame to enable the vehicle to travel over rough terrain with all the wheels on the ground, there has been provided in the past an articulating or connecting joint structure between the two frames which mounts the frames for pivotal movement for steering about a substantially vertical pivot axis. Steering is effected by pivoting the frames relative to each other about the vertical pivot axis. This structure has many advantages over similar vehicles in which only the wheels are turned for steering, but there has been some difficulty in keeping the frames straight when it is desired to travel in a straight line. It would be desirable to provide an articulated vehicle in which the frames tend to assume aligned positions and which also permit easy steering.

An object of the invention is to provide a vehicle articulated on a cant.

Another object of the invention is to provide a close-coupled joint structure for a front end loader articulated on a cant.

A further object of the invention is to provide a front end loader having a rear frame and a front frame connected together on a pivot canted relative to the vertical which tends to keep the frames in a straight line.

Another object of the invention is to provide in a front end loader a close-coupled articulated joint structure having a yoke including arms having pivot points on a canted axis.

The invention provides an articulated vehicle including a load carrying front section and a rear section connected together by a close-coupled articulated joint structure for relative movement about both a pivot axis canted slightly relative to the vertical and a generally horizontal pivot axis. The joint structure includes a yoke having a pair of arms connected to the frame of the rear section for pivotal movement about the canted pivot axis. Preferably a pair of cylinders are mounted on the yoke and extend toward a pair of arms on the front frame to provide a sustained restraining force resisting relative pivotal movement of the frames about the horizontal pivot axis.

A complete understanding of the invention may be obtained from the following detailed description of a vehicle articulated on a cant forming a specific embodiment thereof, when read in conjunction with the appended drawings, in which.

Figure 3:
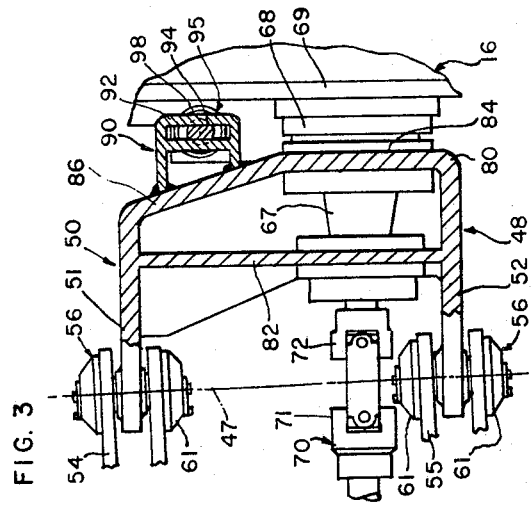
FIG. 3 is an enlarged vertical sectional view taken along line 3—3 of FIG. 2.

Referring now in detail to the drawings, there is shown therein an articulated vehicle 10 forming a specific embodiment of the invention. The vehicle 10 is a front end loader generally like the front end loader disclosed in U.S. Patent 2,811,265 except as disclosed herein. The vehicle 10 includes a rear section 12 (FIGS. 1 and 2) having an engine (not shown) in a housing 14 and a front section 16 carrying a boom 18. The boom carries a bucket support 20, which supports pivotally a bucket 22 movable relative to the support by a hydraulic mechanism (not shown). A hoist cylinder 26 serves to raise and lower the boom 18, and the boom normally carries the bucket and any load therein in an outboard position. The front section 16 includes a pair of spaced wheels 28 mounted rotatably on an axle 30 fixed to front frame 32 of the front section 16. A rear axle 40 carries a pair of spaced wheels 42 and is supported by rear frame 44 of the rear section 12. A cab 46 is also supported by the frame 32.

Figure 4:
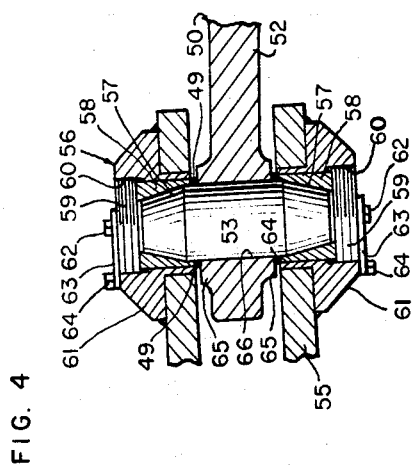
FIG. 4 is an enlarged vertical sectional view taken substantially along line 4—4 of FIG. 2.
Figure 1:
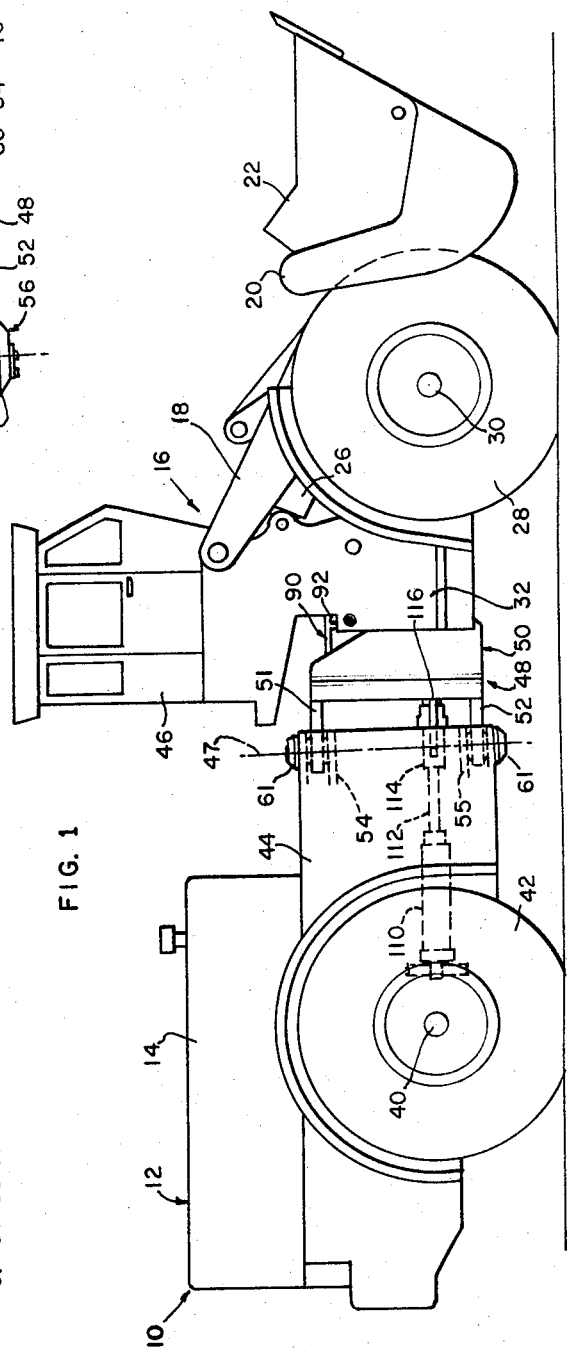
FIG. 1 is a side elevation view of a vehicle articulated on a cant forming one embodiment of the invention.

The frames 32 and 44 are connected together for relative pivotal movement about a canted axis 47 by a close-coupled articulated joint structure 48. The axis 47 lies in a vertical plane including the longitudinal centerline of the rear section 14, and is inclined or canted rearwardly and upwardly, as illustrated in FIG. 1, at an angle of about 1½ degrees to the vertical. The joint structure 48 includes a yoke 50 having arms 51 and 52 pivotal on pins 53 carried by forked, hinging brackets or clevises 54 and 55 fixed rigidly to the rear frame 44, whereby the yoke 50 is mounted pivotally relative to the frame 44 on the canted pivot axis 47. The pins 53 are on the axis 47 and form portions of radial-and-thrust bearings 56 (FIG. 4). The pins 53 have tapered ends 57 (FIG. 4) fitting closely and rotatably in split, tapered bushings 58 pressed toward each other by caps or plugs 59 screwed into tapped bores 60 in bosses or headed bushings 61 welded to the arms of the clevises 54 and 55. The plugs have square or hexagonal heads 62 which may be engaged by a wrench for driving the plugs farther into the tapped bores 60. Keying plates 63 having sockets complementary to the heads 62 are removably secured to the bosses 61 by cap screws 64. O-rings 49 positioned between boss portions 65 of the arms 51 and 52 act as seals to keep lubricant in and dust out of the bearings. The pins 53 are press-fitted into bores 66 in the arms 51 and 52.

The yoke 50 carries rigidly between the arms thereof a tubular bearing housing 67 (FIG. 3), which journals and holds against thrust a sleeve-like spindle 68 rigidly and detachably secured to a wall 69 of the frame 32. The tubular bearing housing 67 is journaled on the yoke for pivotal movement thereon about a horizontal pivot axis by bearing means (not shown) and forms a joint structure similar to that disclosed and claimed in my copending application Ser. No. 340,215, filed Jan. 27, 1964, for "Close-Coupled Articulated Vehicle" and assigned to the common assignee. A known drive shaft line 70 having a splining connection (not shown) therein and two universal joints 71 and 72 spaced equidistantly from the canted pivot axis 47 extends from the engine 14 (FIG. 1) through the spindle 68 (FIG. 3) to the drive of the front wheels 28.

Figure 2:
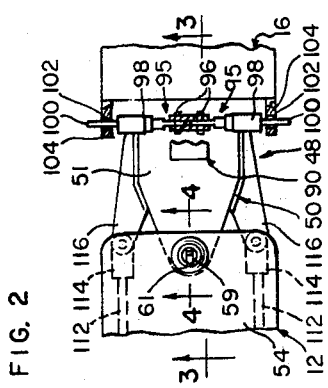
FIG. 2 is a fragmentary top plan view of the vehicle of FIG. 1.

The yoke 50 includes a generally U-shaped, heavy plate-like member 80, which includes the arms 51 and 52. The yoke also includes a bracing plate 82 at the left-hand end of the bearing housing 67 integral with the arms 51 and 52 and a lower, vertical portion 84 of the member 80. A sloping portion 86 of the member 80 joins the portion 84 to the arm 51, and there is provided a mounting bracket 90 integral with the sloping portion and having a pair of clevis portions 92 (FIGS. 2 and 3). A pair of piston rods 94 of cylinder devices 95 are connected pivotally to the clevis portions 92 by pins 96. The piston rods 94 are rigid with pistons (not shown) in hydraulic cylinders 98. Rods 100 rigid with an axially aligned with the cylinders 98 extend slidably and pivotally through loose bores 102 formed in rigid lugs 104 integral with and rigid with the frame 32. Hydraulic liquid under a sustained pressure preferably maintained equal to that supplied to the hoist cylinder 26 is supplied to the cylinders 98, and tends to keep the cylinder devices fully extended. Whenever the front frame 32 is pivoted about the horizontal pivot axis relative to the rear frame 44, one of the lugs 104 engages the cylinder 98 of the cylinder device 95 adjacent thereto and contracts the cylinder device. The cylinder device resists such contraction with a sustained force proportional to the pressure on the hydraulic liquid therein, which maintains high the counterbalancing effect of the rear section 14 on the front section 16 even when the sections are turned relative to each other about the axis 47.

A pair of hydraulic cylinders 110 (FIG. 1) are connected on vertical pivot axes to the frame 44 and rods 112 integral with pistons (not shown) in the cylinders 110 are provided for steering the vehicle. The clevises 114 are connected pivotally to plate-like arms 116 (FIG. 2) positioned in a horizontal plane and forming integral parts of the yoke 50.

OPERATION

As the vehicle 10 is driven, pivoting of the front section 16 about the canted pivot axis 47 from an aligned position relative to the rear section 12 raises the coupled ends of the sections 14 and 16 because of the cant or inclination of the axis 47. This raising is opposed by gravity, whereby the turning of the sections 12 and 16 relative to each other on the axis 47 is resisted with a force which tends to move the sections back into horizontal alignment. This provides a caster effect so that perfect trailing is achieved. The vehicle also steers easily with the power steering system provided by the cylinders 110, the inclination to the vertical of the axis 47, while being sufficient to cause the sections to trail excellently, being sufficiently small that only low power is needed to turn the vehicle.

The cylinder devices 95 (FIG. 2) are yielding and are supplied with hydraulic liquid under pressure. The cylinder devices 95 resist with a sustained force turning of the sections 14 and 16 relative to each other about the horizontal axis, which keeps high the counterbalancing force of the rear section 14 on the front section 16 even when the sections are turned to their extreme positions about the axis 47. This counterbalancing mechanism formed by the bracket 90, the cylinder devices 95 and the lugs 104 is very compact and is positioned conveniently and up away from road dirt and the like.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a front end loader,
a rear frame having a front end and a rear end and also being provided at the front end thereof with an upper clevis and a lower clevis,
a pair of spaced wheels supporting the rear end of the rear frame,
the clevises being in a vertical plane and being offset from the vertical and aligned on a pivot axis canted relative to the vertical with the upper clevis being positioned rearwardly of the lower clevis,
a yoke having a pair of arms and a central horizontal journal portion,
means connecting the arms pivotally to the clevises,
a front frame having a front end and a read end,
a pair of spaced wheels supporting the front end of the front frame,
means connecting the rear end of the front frame to the journal portion of the yoke for pivotal movement of the rear frame relative to the yoke only about a horizontal pivot axis,
a bracket having a pair of pivot portions and connected rigidly to the central portion of the yoke in a position extending forwardly thereof,
a pair of contractable cylinder devices mounted pivotally in a vertical plane to the pivot portions of the bracket,
and a pair of lugs secured to the head end of the front frame and engaging the outer ends of the cylinder devices.

2. In a front end loader,
a rear frame,
a pair of wheels supporting the rear portion of the rear frame,
a front frame,
a pair of wheels supporting the front portion of the front frame,
outboard load carrying means carried by the front frame,
a yoke having a central portion and a pair of arms connected to the front end of the rear frame for pivotal movement relative to the rear frame about a generally vertical axis,
means connecting the central portion of the yoke pivotally to the rear end of the front frame for relative pivotal movement therebetween about a substantially horizontal pivot axis,
a bracket fixed to the central portion of the yoke in a position extending forwardly from the yoke,
a pair of lugs on the front frame in positions bracketing the bracket,
a first contractible cylinder device engaging one of the lugs and pivotally connected to the bracket,
a second contractible cylinder device engaging the other lug and pivotally connected to the bracket,
the cylinder devices being generally aligned and extending in opposite directions from the bracket.

3. The front end loader of claim 2 wherein each of the cylinder devices includes a piston member connected pivotally to the bracket and also has a cylinder member having at its outer end a pin, each of the lugs having a hole therethrough through which the pin extends slidably and pivotally.

4. In a vehicle articulated on a canted axis,
a first frame,
a pair of spaced wheels carrying one end of the first frame,
a second frame,
a pair of spaced wheels carrying one end of the second frame,
hinge means on the other end of the first frame and sloping relative to the vertical,
yoke means including a pair of arms connected to the hinge means for pivotal movement of the yoke means relative to the first frame about a canted pivot axis, means mounting the yoke means on the other end of the second frame for pivotal movement relative to the yoke means about a horizontal pivot axis, a forwardly projecting bracket on the yoke means, a pair of generally aligned hydraulic cylinder devices mounted on the bracket in positions extending transversely of the yoke means, and a pair of lugs engaging the outer ends of the cylinder devices, whereby the cylinder devices resist relative pivotal movement of the frames about said horizontal pivotal axis.

References Cited

UNITED STATES PATENTS

| | | | |
|---|---|---|---|
| 1,408,895 | 4/1922 | Lamoreaux | 280—492 |
| 2,941,612 | 6/1960 | Bernotas | 180—51 |
| 3,191,709 | 6/1965 | Symons | 180—51 |

LEO FRIAGLIA, *Primary Examiner.*

BENJAMIN HERSH, *Examiner.*

J. H. BRANNEN, L. D. MORRIS, *Assistant Examiners.*

UNITED STATES PATENT OFFICE
CERTIFICATE OF CORRECTION

Patent No. 3,384,196

May 21, 1968

Harry L. Fielding

It is certified that error appears in the above identified patent and that said Letters Patent are hereby corrected as shown below:

Column 3, line 21, "an" should read -- and --. Column 4, line 30, "head" should read -- rear --.

Signed and sealed this 9th day of September 1969.

(SEAL)
Attest

Edward M. Fletcher, Jr.
Attesting Officer

WILLIAM E. SCHUYLER, JR.
Commissioner of Patents